United States Patent [19]

Nakamichi

[11] Patent Number: 4,903,025
[45] Date of Patent: Feb. 20, 1990

[54] SIGNAL PATH SETTING CIRCUIT

[75] Inventor: Takeshi Nakamichi, Kodaira, Japan

[73] Assignee: Nakamichi Corporation, Kodaira, Japan

[21] Appl. No.: 177,616

[22] Filed: Apr. 5, 1988

[30] Foreign Application Priority Data

Apr. 7, 1987 [JP] Japan .............................. 62-52470[U]
Feb. 17, 1988 [JP] Japan .............................. 63-19867[U]

[51] Int. Cl.$^4$ ........................................... G11B 27/02
[52] U.S. Cl. ...................................... 341/123; 341/61; 341/110; 360/61
[58] Field of Search ....................... 341/61, 79, 68, 67, 341/110, 123, 148, 152; 360/32, 39, 8, 61, 62; 369/59, 60

[56] References Cited

U.S. PATENT DOCUMENTS

| | | | |
|---|---|---|---|
| 4,203,139 | 5/1980 | Horiuchi .................................. | 360/62 |
| 4,363,049 | 12/1982 | Ohtsuki et al. ......................... | 360/32 |
| 4,446,489 | 5/1984 | Kojima et al. .......................... | 360/61 |
| 4,616,271 | 10/1986 | Yasukawa et al. ..................... | 360/39 |
| 4,628,373 | 12/1986 | Takahashi et al. ..................... | 360/62 |
| 4,673,916 | 6/1987 | Kitamura et al. ...................... | 341/123 |
| 4,677,621 | 6/1987 | Sato et al. ............................... | 360/32 |
| 4,734,797 | 3/1988 | Takahashi et al. ..................... | 360/32 |
| 4,758,907 | 7/1988 | Okamoto et al. ...................... | 360/32 |

Primary Examiner—William M. Shoop, Jr.
Assistant Examiner—H. L. Williams
Attorney, Agent, or Firm—Pearne, Gordon, McCoy & Granger

[57] ABSTRACT

A signal path setting circuit for a digital recorder comprising: a digital-to-analog converter hereinafter referred to as a D/A converter to convert a digital signal into an analog signal, a first switch to supply to the D/A converter a selected signal from a plurality of digital signals including a first digital signal from recording and playing back means for making a digital recording and playback through a recording medium, a second switch to supply a selected signal from a plurality of analog signals including the analog signal from the D/A converter, and an analog-to-digital converter (hereinafter referred to as an A/D converter) to convert the analog signal from the second switch into a second digital signal which is adapted to be directly or selectively supplied to the recording and playing back means.

6 Claims, 8 Drawing Sheets

SIGNAL PATH SETTING CIRCUIT

BACKGROUND OF THE INVENTION

A signal path setting circuit similar to that claimed in the instant invention has been used for a digital recorder to make a digital recording of limited sampling frequency.

FIG. 8 shows a fundamental example of a commercially used digital recorder. A digital signal S1 is modulated in accordance with a standardized digital audio interface format (hereinafter referred to as DAIF) and then the input to a digital input terminal 1 is demodulated by a DAIF demodulator 2 and then supplied to an input point SW1(a) of a switch SWI.

An analog signal $S_2$ is first input to an analog input terminal 6, then has its level adjusted by an input potentiometer 7, its high band component attenuated by a low pass filter 8, and is finally introduced into analog-to-digital converter means (A/D converter means) 9. The A/D converter means 9 includes a sample and hold circuit 18 and an analog-to-digital converter (hereinafter referred to as A/D converter) 19 and serves to sequentially convert analog signals sampled by predetermined sampling frequency f into digital signals and to supply them to an input point SW1(b) of the switch SW1.

The low pass filter 8 is designed to attenuate frequencies of greater than f/2 with a sharp cut-off characteristic.

The switch SW1 serves to select one of the digital signals introduced at the input points SW1(a) and SW1(b) and to supply it to modulated signal recording and playing back means 3.

The modulated signal recording and playing back means 3 includes a signal processing circuit (A) 12, a modulating circuit 13, a recording and playing back mechanism 14, a demodulating circuit 15, a signal processing circuit (B) 16 and a recording/playing back switch (hereinafter referred to as RP switch) 17.

The signal processing circuit (A) 12 serves to make a code addition and an interleave of the input digital signal for correction of the errors and to supply the resulting signal to the modulating circuit 13.

The modulating circuit 13 serves to modulate the input digital signal into a digital recording signal in accordance with an 8-10 modulation system, for example, and to supply the resulting signal to the recording and playing back mechanism 14 which has a predetermined output timing.

The recording and playing back mechanism 14 includes tape drive means and rotary head means and serves to record the digital recording signal on a magnetic tape in record mode and to play it back from the magnetic tape in playback mode. The digital signal played back in the playback mode is demodulated by the demodulating circuit 15 in accordance with an 8-10 modulation system, then has the errors corrected and is deinterleaved by the signal processing circuit (B) 16 and is introduced into the playback input point (hereinafter referred to as P input point) of the RP switch 17.

The RP switch 17 directly receives the digital signal selected by the switch SW1 at a recording input point (hereinafter referred to as R input point) and supplies the R input digital signal to a DAIF modulator 4 as well as to digital-to-analog converter means (D/A converter means) 10 when in the recording mode and supplies the P input digital signal to the DAIF modulator 4 as well as to the D/A converter means 10.

The D/A converter means 10 includes a digital-to-analog converter (hereinafter referred to as D/A converter) 20 and a low pass filter 21 to attenuate the signals with a frequency of greater than f/2 with a sharp cut-off characteristic, and serves to convert the input digital signal into an analog signal $S_4$ and to supply it to an analog output terminal 11.

Although FIG. 8 illustrates a single circuit construction of the switch SW1 and the RP switch 17 for purposes of simplification, in practice, the number of circuits may be set in accordance with the number of signals to be switched. Also, although the recorder as shown in FIG. 8 has only one analog input terminal and one analog output terminal, it may have a plurality of input terminals and output terminals for two or four channels. In this case, the analog signals introduced at the input terminals are converted by the A/D converter means, which has a multiplexer, into digital signals including a plurality of channel informations in accordance with a predetermined format. The played-back digital signal is again divided by the D/A converter means, which has a multiplexer, into a plurality of channel analog signals which are output from respective output terminals corresponding to the input terminals.

In the digital tape recorder of FIG. 8, in the recording mode, where the RP switch 17 is set to select the R input digital signal, if the switch SW1 is set so as to select the input signal at the input point SW1(b), a digital recording signal based on the analog signal $S_2$ input to the analog input terminal 6 is recorded on the magnetic tape, while a digital output signal or an analog output signal based on the analog signal $S_2$ is output from the digital output terminal 5 or the analog output terminal 11, respectively.

In the recording mode, if the switch SW1 is set so as to select the input signal at the input point SW1(a), a digital recording signal based on the digital signal $S_1$ input to the digital input terminal 1 is recorded on the magnetic tape, while the digital or analog output signal corresponding to the digital signal $S_1$ is output from the digital output terminal 5 or the analog output terminal 11, respectively.

In the playback mode, the RP switch 17 is set to introduce the digital playback signal input to the P input point and the digital or analog output signal corresponding to the digital playback signal is output from the digital output terminal 5 or the analog output terminal 11, respectively.

In the conventional digital tape recorder, if the modulated signal recording and playing back means 3 has a sampling frequency of 48 kHz or 32 kHz, for example, for which the recording operation is possible, the sampling frequency of the digital signal $S_1$ input to the digital input terminal 1 is also limited. Thus, if a digital signal processed by the sampling frequency of 44.1 kHz output from a peripheral audio instrument such as a compact disc player is to be recorder, the digital signal is normally converted into an analog signal within the peripheral audio instrument and the analog signal is input to the analog input terminal 6 to be recorded. It will be noted that this makes the signal more susceptible to the introduction of external noise in the course of the signal's path into the input terminal 6, and this causes the quality of sound to be poorer.

SUMMARY OF THE INVENTION

Accordingly, it is a principal object of this invention to provide a signal path setting circuit designed to receive a digital signal without converting it into an analog signal even though it has a sampling frequency other than one determined by a modulated signal recording and playing back means.

It is another object of this invention to provide a signal path setting circuit designed to minimize a path of an analog signal and therefore to minimize the introduction of external noise.

It is a further object of this invention to provide a signal path setting circuit designed to switch an input or output signal in the form of digital and analog signals so as to variously set output and recording signals.

It is a further object of this invention to provide a signal path setting circuit designed to effectively utilize a digital-to-analog converter provided therein.

In accordance with one aspect of the present invention, there is provided a signal path setting circuit comprising:

first switching means to select a signal from a plurality of digital signals including a first digital signal from recording and playing back means for making digital recording and playback through a recording medium;

D/A converter means to receive said selected digital signal from said first switching means and to convert said digital signal into a first analog signal;

second switching means to supply a selected signal from a plurality of analog signals including said first analog signal from said D/A converter means;

and A/D converter means to convert said analog signal from said second switching means into a second digital signal.

In accordance with another aspect of the present invention, there is provided a signal path setting circuit comprising:

A/D converter means to convert at least a first analog signal into a second digital signal;

first switching means to select one of a first digital signal and said second digital signal from said A/D converter means and supply the selected one to recording and playing back means to digitally record and play it back through a recording medium;

second switching means to select one of a third digital signal from said recording and playing back means and said first digital signal;

D/A converter means to convert said digital signal from said second switching means into a second analog signal, which is designed to have an output from an analog output terminal; and third switching means to select one of said first analog signal and said second analog signal from said D/A converter means.

BRIEF DESCRIPTION OF THE DRAWINGS

The above and other objects and features of this invention will be apparent from the following description of the embodiments in conjunction with the accompanying drawings, in which.

DETAILED DESCRIPTION OF THE PREFERRED EMBODIMENTS

Figure 1:
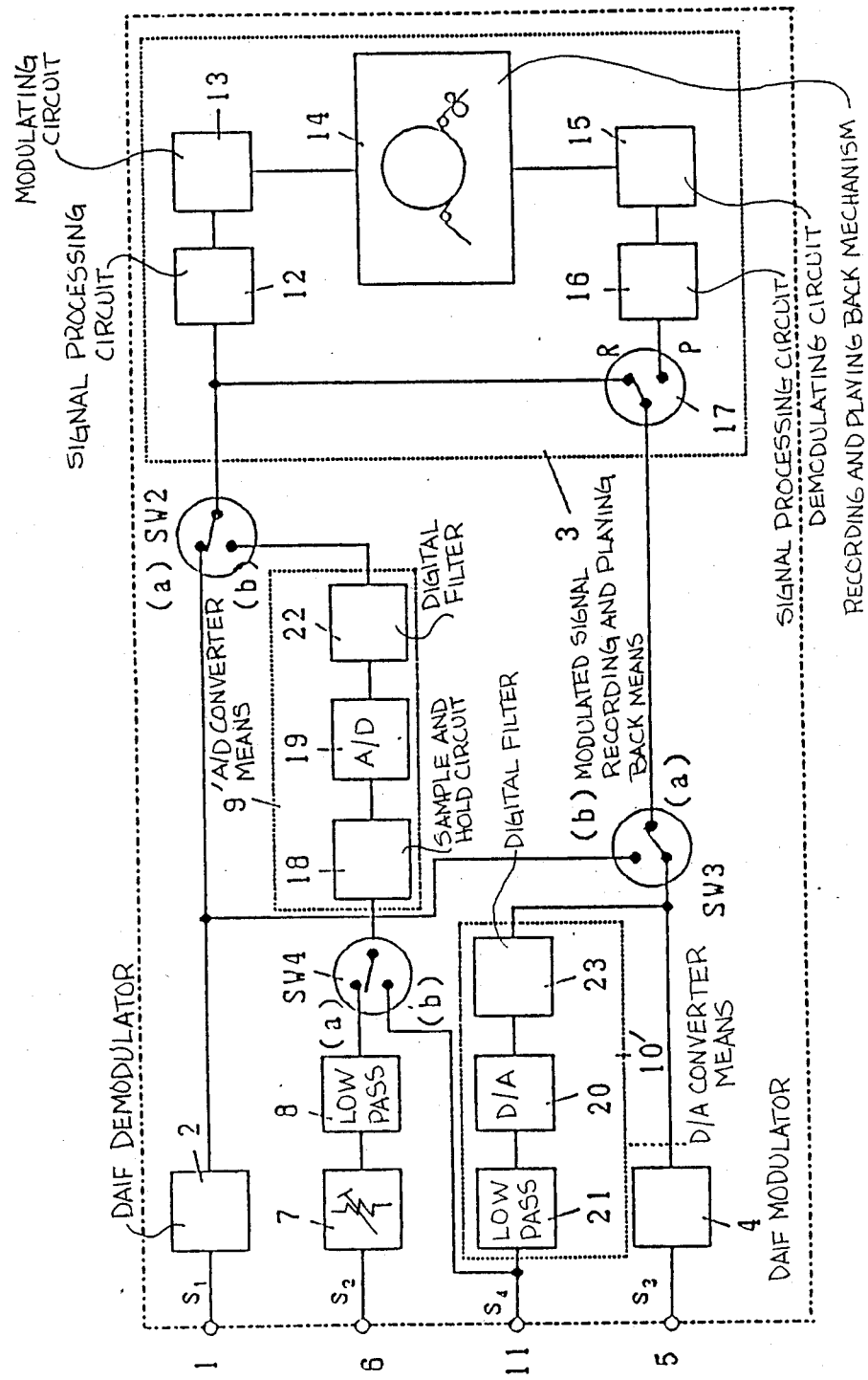
FIGS. 1 through 7 are block diagrams of digital recorders using signal path setting circuits constructed in accordance with various embodiments of this invention.

A digital signal $S_1$ is modulated in accordance with a standardized DAIF and input to a digital input terminal 1, demodulated by a DAIF demodulator 2 and then supplied to an input point SW2(a) of a switch SW2 as well as to an input point SW3(b) of a switch SW3. An analog signal $S_2$ input to an analog input terminal 6 has its level adjusted by an input potentiometer 7, its high band component removed by a low pass filter 8, and is then supplied to an input point SW4(a) of a switch SW4. An analog signal $S_4$ output from D/A converter means 10' enters an input point SW4(b) of the switch SW4. The switch SW4 serves to select one of the analog signals introduced into the input points SW4(a) and SW4(b) and supplies the selected one to A/D converter means 9'. The A/D converter means 9' includes a sample and hold circuit 18, a digital filter 22 other than a sample and hold circuit 18, and an A/D converter 19, as in the A/D converter means 9 of the conventional digital recorder of FIG. 8, and serves to sequentially convert analog signals sampled by a predetermined sampling frequency f into digital signals and to supply them to an input point SW2(b) of the switch SW2. The low pass filter 8 is adapted to attenuate frequencies greater than f/2. The switch SW2 serves to select one of the digital signals introduced at the input points SW2(a) and SW1(b) and to supply it to modulated signal recording and playing back means 3.

Figure 8:
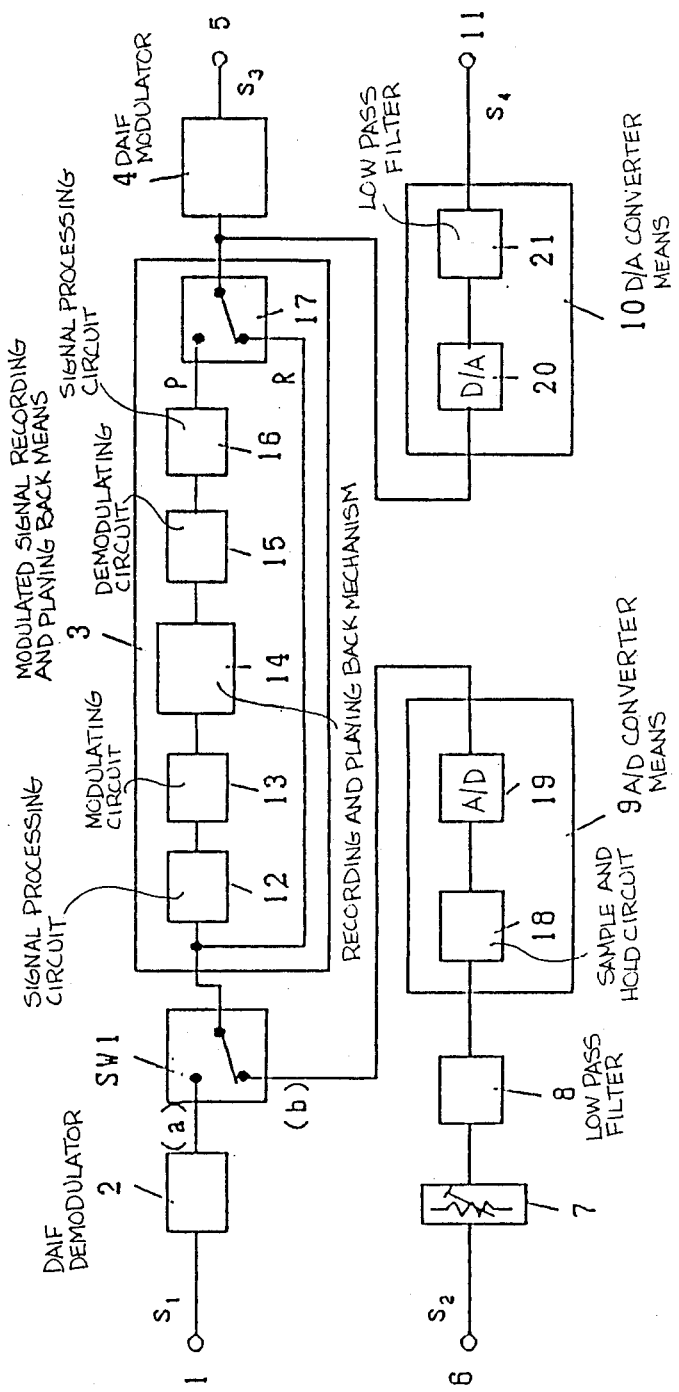
FIG. 8 is a block diagram of a digital recorder using a conventional signal path setting circuit.

As previously mentioned with respect to the conventional digital recorder of FIG. 8, the modulated signal recording and playing back means 3 includes a signal processing circuit (A) 12, a modulating circuit 13, a recording and playing back mechanism 14, a demodulating circuit 15, a signal processing circuit (B) 16 and a recording/playing back switch (RP switch) 17. Since the functions of these components are similar to those of FIG. 8, the description of them will be omitted.

The digital signal output from the modulated signal recording and playing back means 3 enters an input point SW3(a) of the switch SW3.

The switch SW3 serves to select one of the digital signals introduced at the input points thereof. The selected digital signal is supplied through a DAIF modulator 4 to a digital output terminal 5 and also to the D/A converter means 10'. The D/A converter means 10' includes digital-to-analog converter (D/A converter) 20, a digital filter 23 other than the digital-to-analog converter (D/A converter) 20, and a low pass filter 21 to attenuate the frequencies greater than f/2 as in the D/A converter means 10 of the conventional digital recorder of FIG. 8. The D/A converter means 10' serves to convert the input digital signal into an analog signal $S_4$ and to supply it to an analog output terminal 11 and also to an input point SW4(b) of a switch SW4.

It should be noted that, in cases where switch SW4 is set so as to select the input signal at the input point SW4(b), the digital signal input to the D/A converter means 10' and the digital signal output from the A/D converter means 9' are adjusted to be identical. This may be accomplished by providing a buffer circuit (not shown) between the switch SW4 and the A/D converter means 9' to adjust the gain of the output signal.

In operation, the switch SW4 is set so as to select the input signal at the input point SW4(a), as shown in FIG. 1. In this case, if the switch SW3 is set so as to select the input signal at the input point SW3(a) as shown in FIG.

1, the digital recorder of FIG. 1 serves as the conventional digital recorder as shown in FIG. 8. If the switch SW3 is set so as to select the input signal at the input point SW3(b), then the circuit of FIG. 1 serves as a D/A converter for the digital signal $S_1$ input to the digital input terminal 1 to output the analog signal $S_4$ from the analog output terminal 11 regardless of whether in the recording or playing back mode.

Suppose the switch SW4 is set so as to select the input point SW4(b) thereof. In this case, if the switches SW2 and SW3 are set so as to select the input points SW2(b) and SW3(b), respectively, then the digital signal $S_1$ introduced at the digital input terminal 1, and having a sampling frequency other than that at which the modulated signal recording and playing back means 3 is operative, is converted by the D/A converter means 10' into an analog signal, and thereafter this analog signal is converted by the A/D converter means 9' into the digital signal having the sampling frequency equal to that at which the modulated signal recording and playing back means 3 is operative. Thus, the digital signal can be recorded by the recording and playing back means 3. It will be noted that the input signal will pick up less external noise in analog signal form than it would if it were converted into analog signal form by a peripheral instrument and then input to the digital recorder. In addition, it will be noted that the input signal never passes through a potentiometer, which causes the quality of sound to deteriorate, or a low pass filter more than is necessary. Thus, the high quality of sound can be recorded and played back.

Figure 2:
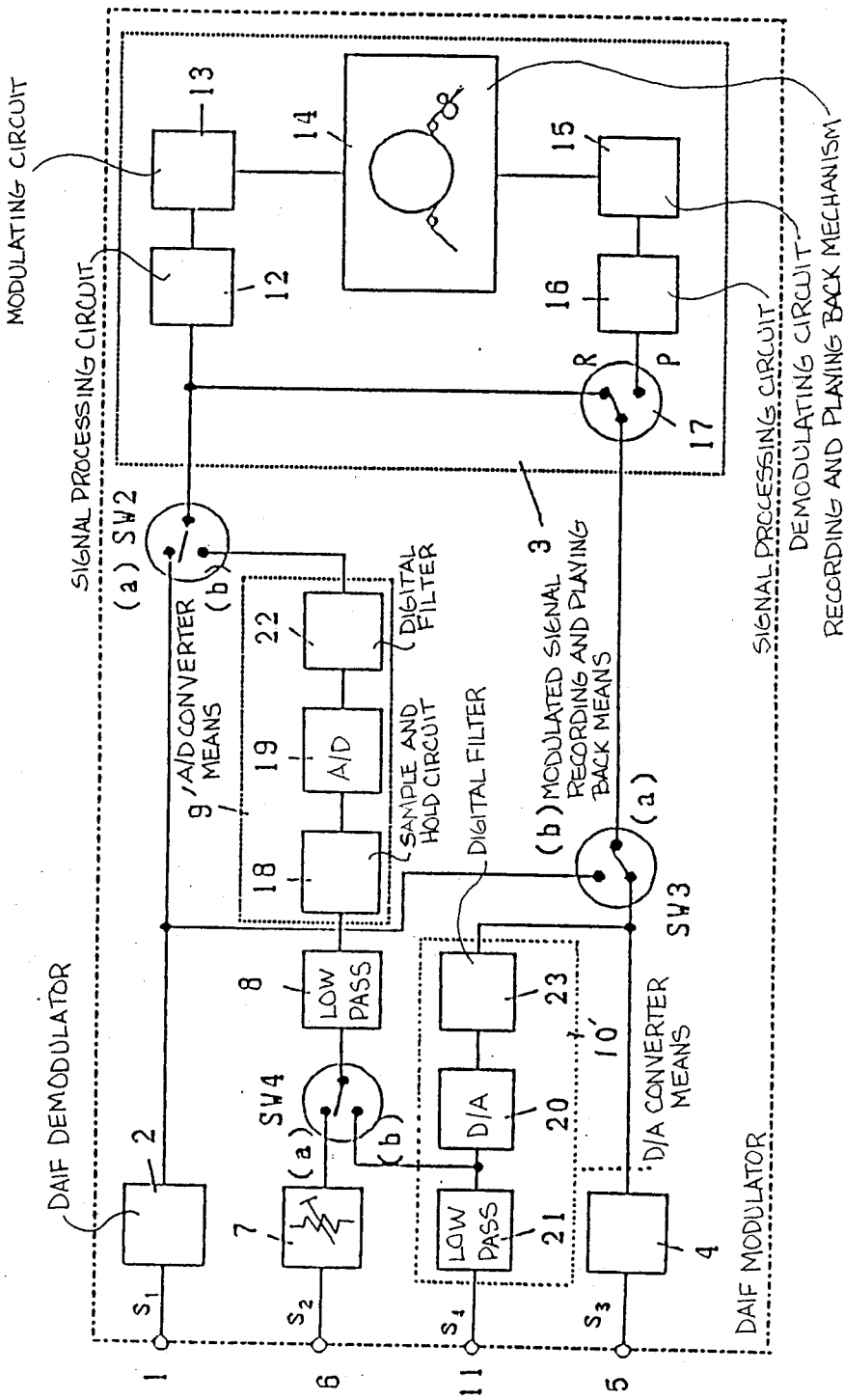

FIG. 2 shows a modification of the signal path setting circuit which is substantially similar to that of FIG. 1, except for the rearrangement of the low pass filter. More particularly, the low pass filter 8, which is connected at the back of the input potentiometer 7 in the circuit of FIG. 1, is, in FIG. 2, connected at the front of A/D converter means 9'. Accordingly, the signal output from the D/A converter 20 is designed to be directly applied to the input point SW4(b) of the switch SW4 without passing through the low pass filter 21. The operation of the circuit of FIG. 2 is substantially similar to that of FIG. 1, except that the analog signal from the D/A converter 20 reaches the A/D converter means 9' through the low pass filter 8, as opposed to reaching it through the low pass filter 21.

Although, for purposes of simplification, the switches SW2 through SW4 in FIGS. 1 and 2 are illustrated to have a single circuit construction in the same manner as the construction of FIG. 8, the number of circuits may be determined in accordance with the number of the switched signals.

Figure 3:
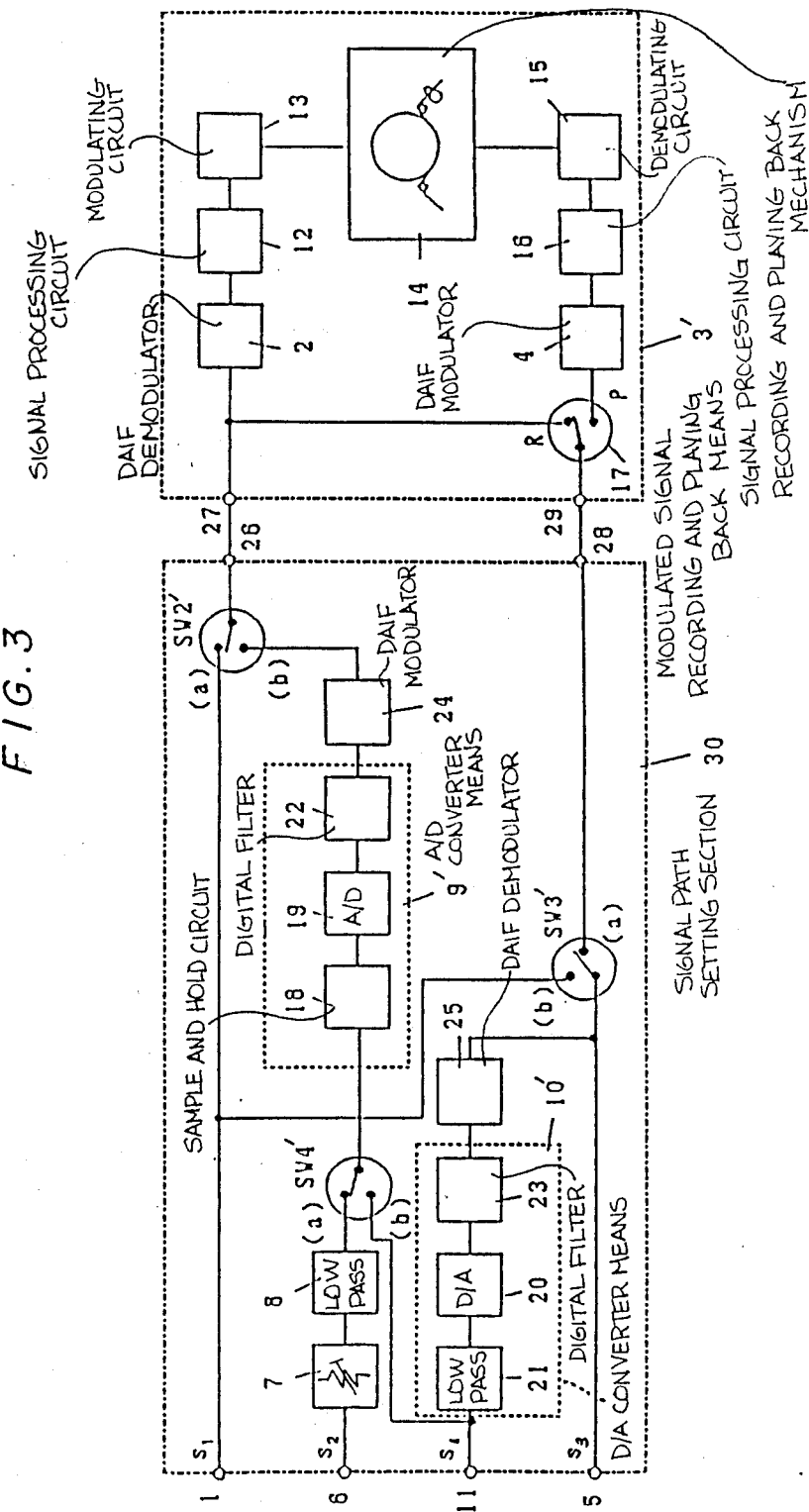

FIG. 3 shows another modification of a signal path setting circuit of this invention. FIG. 3 shows a separate type digital recorder in which the signal path setting section 30 and a modulated signal recording and playing back means 3' are provided in separate containers with respective single circuit type switches SW2' through SW4'. The DAIF demodulator 2 and the DAIF modulator 4 are located within the modulated signal recording and playing back means 3' and connected at the front of the signal processing circuit (A) 12 and the signal processing circuit (B) 16, respectively. Furthermore, an additional DAIF modulator 24 is connected at the back of the A/D converter means 9' while an additional DAIF demodulator 25 is provided at the front of the D/A converter means 10'. Terminals 26 and 28 of the signal path setting section 30 are electrically connected to terminals 27 and 29 of the modulated signal recording and playing back means 3'.

According to the modification of FIG. 3, since the signal transmission between the corresponding DAIF modulators and the DAIF demodulators are made by a single circuit, the switches SW2' through SW4' can be in the form of a single circuit construction with the signals through the switches being digital in accordance with the DAIF.

Figure 4:
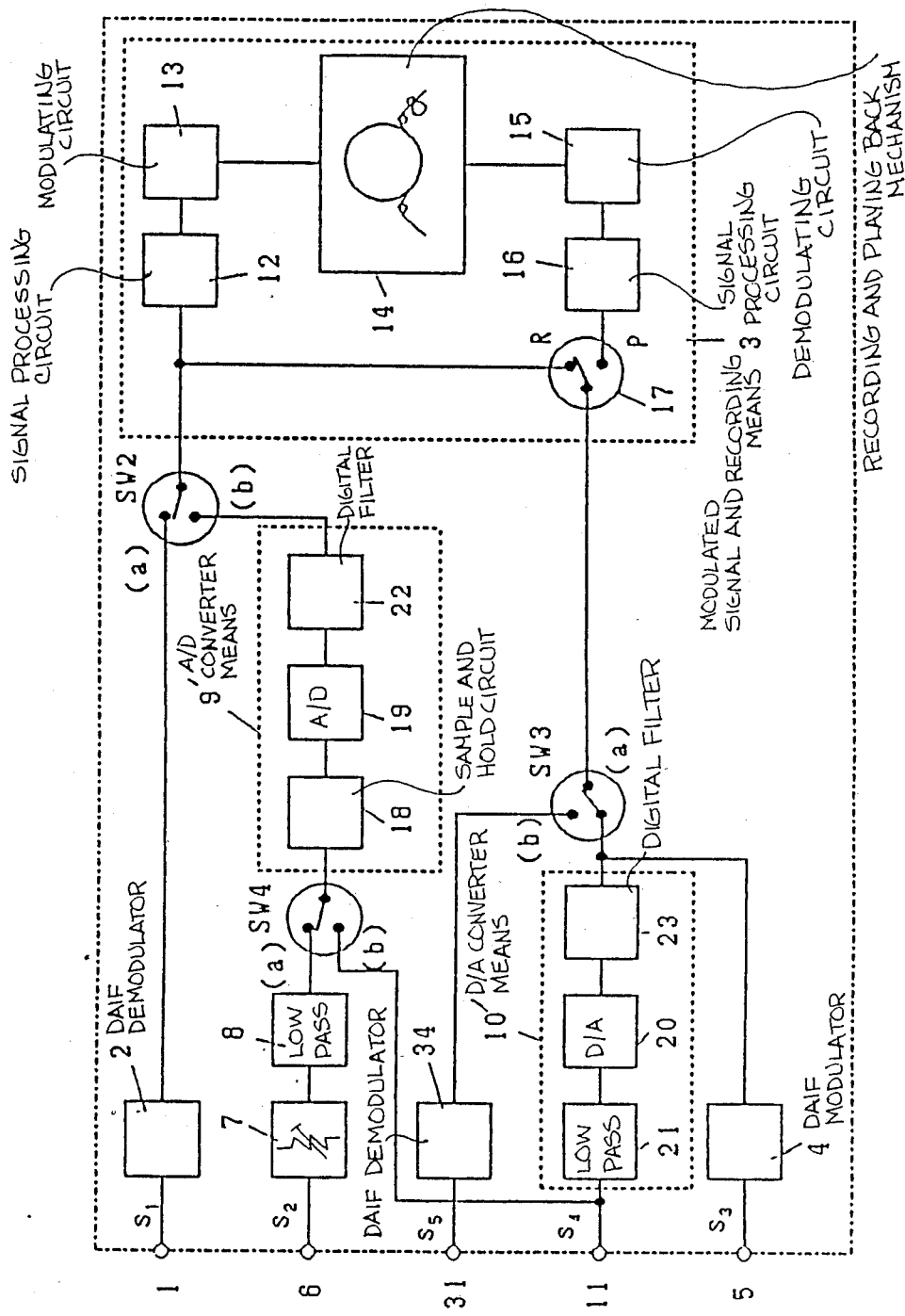

FIG. 4 shows another embodiment of the invention which is substantially similar to that of FIG. 1, but with an additional digital input terminal 31 provided to input a digital signal $S_5$ which is modulated in accordance with the DAIF and the digital signal $S_5$, demodulated by a DAIF demodulator 34, and then applied to the input point SW3(b) of the switch SW3. The digital signal S1, which has a sampling frequency corresponding to that at which the modulated signal recording and playing back means 3 is operative so that it can be directly digitally recorder, is introduced at the digital input terminal 1, while the digital signal $S_5$, which has a sampling frequency other than that at which the modulated signal recording and playing back means 3 is operative so that it can be directly digitally recorded, is introduced at the digital input terminal 31.

In the digital recorder of FIG. 4, when the switch SW3 is set so as to select the input signal at the input point SW3(a), the operation of the circuit of FIG. 1 can be provided by operating the other switches. When the switch SW3 is set so as to select the input signal at the input point SW3(b), the switches SW2 and SW4 are set so as to select the input signals at the input points SW2(b) and SW4(b) in order that the digital signal $S_5$ can be recorded after it is converted into the analog signal. More particularly, the digital signal $S_5$ introduced at the digital input terminal 31 is converted into the analog signal by the D/A converter means 10' within the digital tape recorder and the analog signal is then reconverted by the A/D converter means 9' into the digital signal having a sampling frequency at which the modulated signal recording and playing back means 3 is operative. Thus, it will be noted that the digital signal can be digitally recorded by the modulated signal recording and playing back means 3.

It will be noted that, as with the digital recorder of FIG. 1, the circuit of FIG. 4 has the advantage that the input signal will pick up less external noise in analog signal form than it would if it were converted into analog signal form by a peripheral instrument and then input to the digital recorder. In addition, it will be noted that, as in FIG. 1, the input signal never passes through a potentiometer or a low pass filter more than is necessary. Again, the high quality of sound can be recorded and played back.

Suppose the switches SW3 and SW4 are set so as to select the input signals at the input points SW3(b) and SW4(a), respectively. In this case, the digital signal $S_5$ can be converted into the analog signal which is to be the output from the analog output terminal 11. Simultaneously, the digital signal $S_1$ at the digital input terminal 1 or the analog signal $S_2$ at the analog input terminal 6 can be recorded, both of which can be accomplished by switching the switch SW2.

Figure 5:
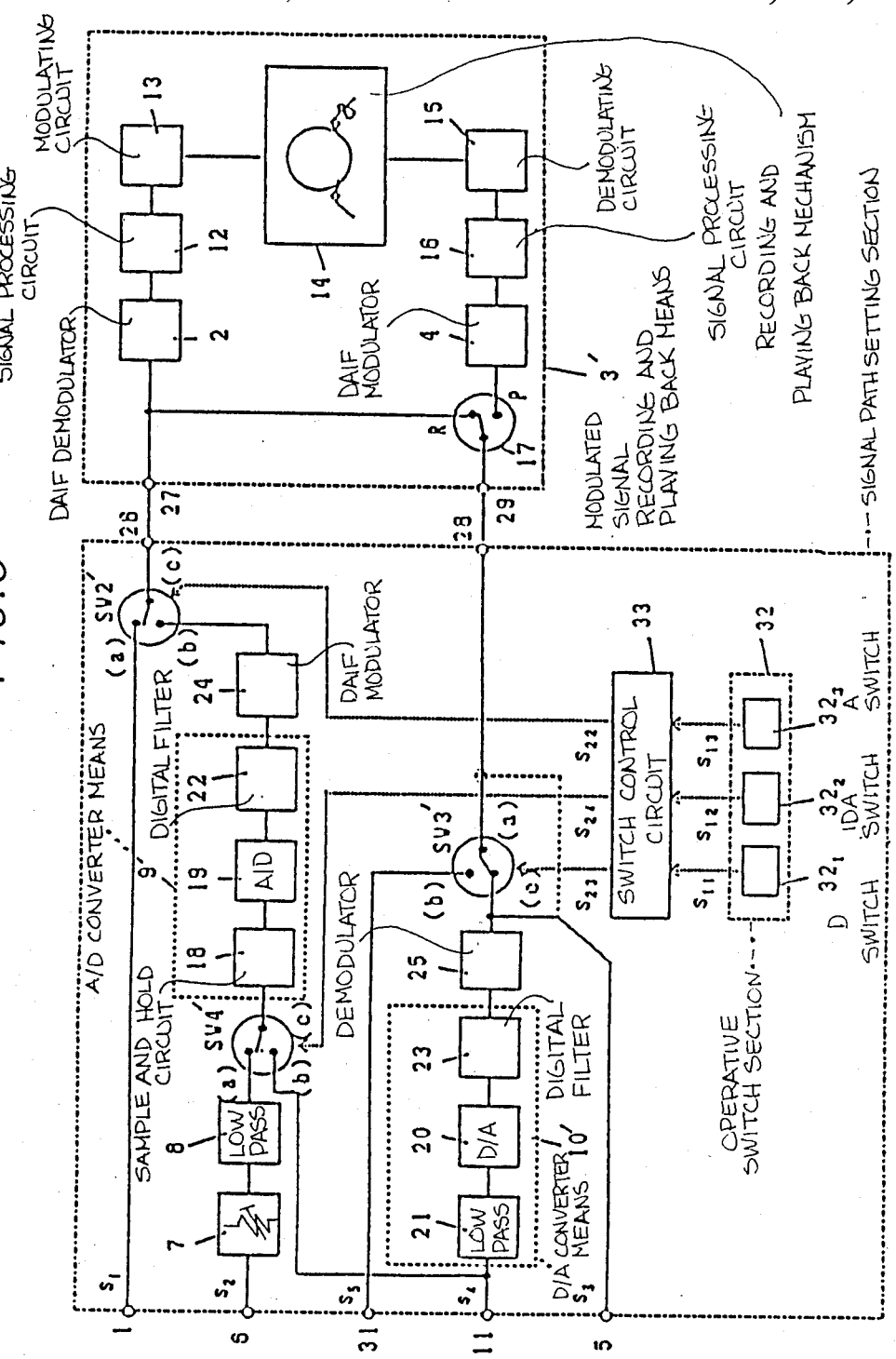

FIG. 5 shows another modification of the signal path setting circuit of FIG. 4. As with FIG. 4, FIG. 5 shows a separate type digital recorder in which the signal path setting section 30' and modulated signal recording and playing back means 3' are provided in separate containers with respective single circuit type switches SW2' through SW4'. The DAIF demodulator 2 and the DAIF modulator 4 are located within the modulated signal recording and playing back means 3' and connected at the front of the signal processing circuit (A) 12 and the signal processing circuit (B) 16, respectively. Furthermore, an additional DAIF modulator 24 is connected at the back of the A/D converter means 9' while an additional demodulator 25 is connected at the front of the D/A converter means 10'. Terminals 26 and 28 of the signal path setting circuit 30' are electrically connected to terminals 27 and 29 of the modulated signal recording and playing back means 3'. According to the modification of FIG. 5, since the signal transmission between the corresponding DAIF modulators and the DAIF demodulators are made by a single circuit, the switches SW2' through SW4' can be in the form of a single circuit construction by the signals through the switches being digital in accordance with the DAIF.

In the digital recorder of FIG. 5, the digital output terminal 5 may be connected to the point SW3'(a), but not to the point SW3'(c), as indicated by a dotted line in the signal path setting section 30'. In this case, although when the switch SW3' is set so as to select the input signal at the input point SW3'(a), the operation is identical to that in the case of the digital output terminal 5 being connected as indicated by the solid line of FIG. 5, when the switch SW3 is set so as to select the input signal at the input point SW3'(b), the operation is different from that in the case of the digital output terminal 5 being connected as indicated by the solid line of FIG. 5. More particularly, if the digital output terminal 5 is electrically connected to the point SW3'(c) of the switch SW3', as indicated by the solid line of FIG. 5, the output signal corresponding to the input digital signal $S_5$ at the digital input terminal 31, is output from the digital and analog output terminals 5 and 11, respectively. On the other hand, if the digital output terminal 5 is electrically connected to the point SW3'(a) of the switch SW3', as indicated by the dotted line of FIG. 5, the signals of the separate paths can be output from the circuit. When the digital output terminal 5 is connected as is indicated by the dotted line of FIG. 5, if the switches SW2', SW3', and SW4' are set so as to select the input signals at the input points SW2'(b), SW3'(b), and SW4'(a), respectively, then the analog signal $S_2$ at the analog input terminal 6 is converted by the A/D converter means 9' into a digital signal which can be applied to the digital output terminal 5 through the RP switch 17 within the modulated signal recording and playing back means 3' while it is recorded thereby and simultaneously the digital signal $S_5$ at the digital input terminal 31 is converted by the D/A converter means 10' into the analog signal, which can be applied to the analog output terminal 11.

Figure 6:
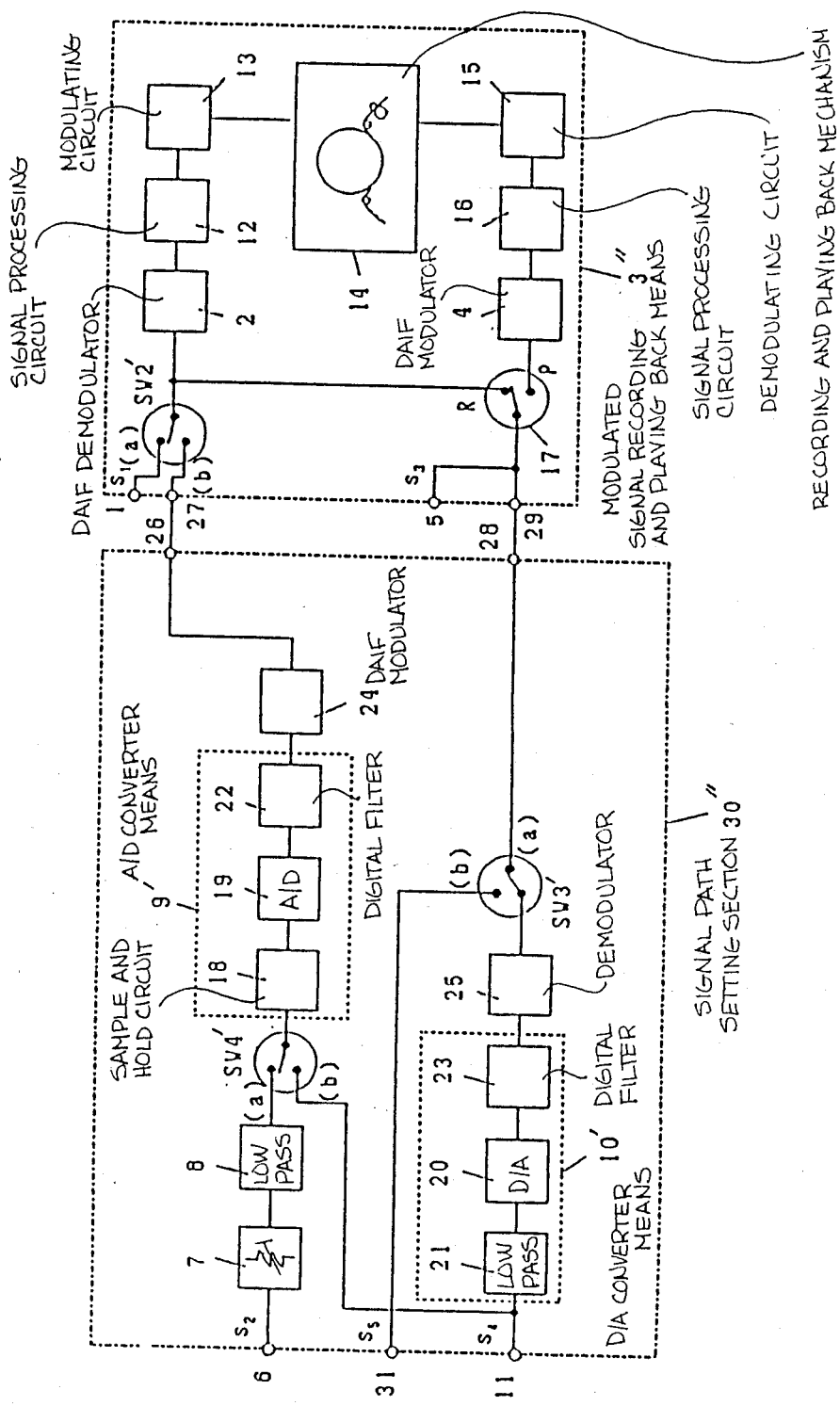

FIG. 6 shows a further modification of the digital recorder of FIG. 5. In the digital recorder of FIG. 6, the arrangement is substantially similar to that of FIG. 5, except that the switch SW2' is connected in the modulated signal recording and playing back means 3', and not in the signal path setting section 30''. Additionally, unlike the recorder of FIG. 5, the digital input terminal 1 and the digital output terminal 5 are connected in the modulated signal recording and playing back means 3'', and not in the signal path setting section 30''. It will thus be noted that the digital terminals 1 and 5 of the modulated signal recording and playing back means 3'' can be electrically connected to a peripheral instrument directly, and not through the signal path setting section 30''.

Figure 7:
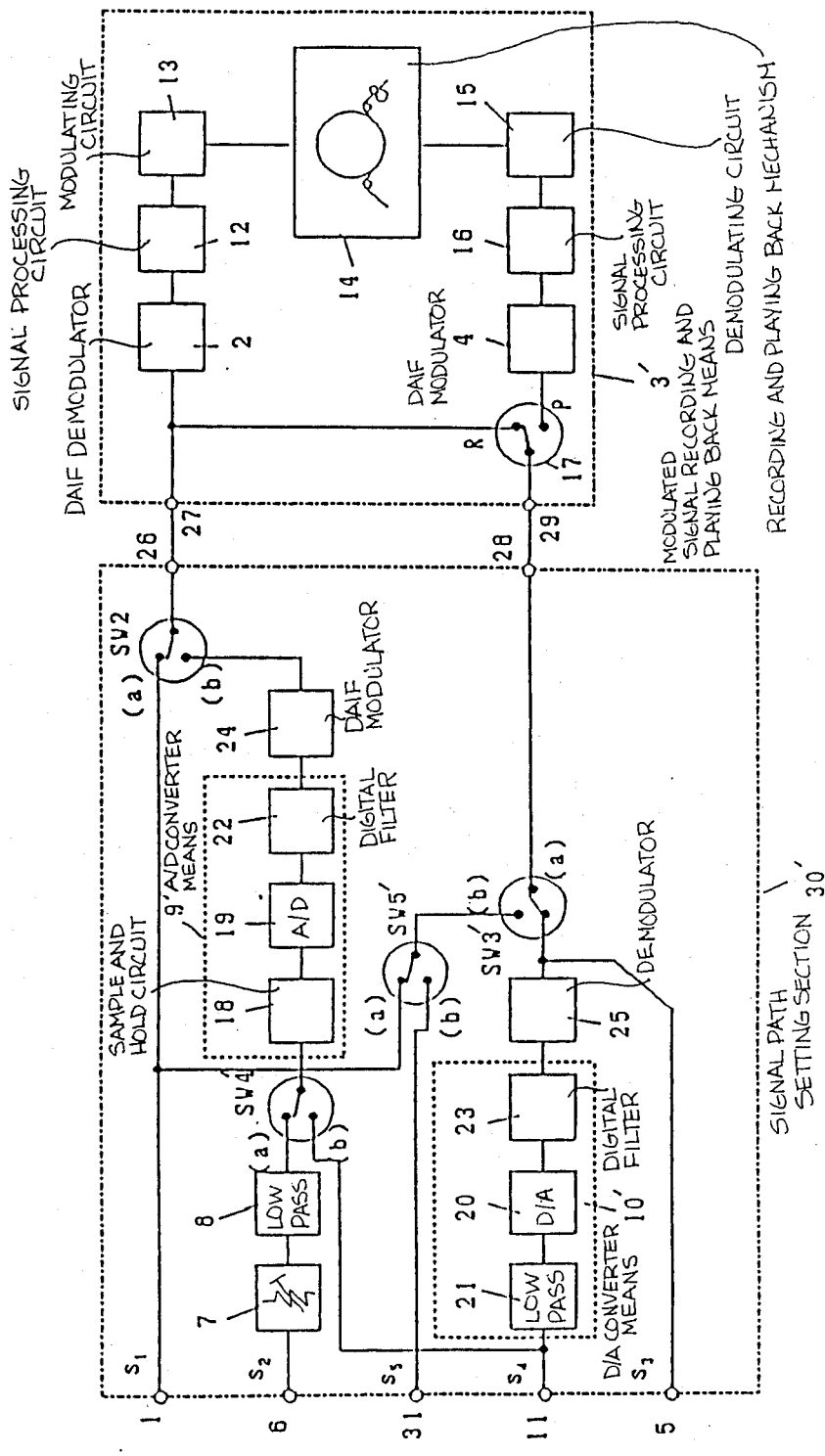

FIG. 7 also shows further modification of the digital recorder of FIG. 5. In this embodiment, an additional switch SW5' is connected in the signal path setting section 30'. The switch SW5' serves to select one of the digital signals $S_1$ and $S_5$ at the digital input terminals 1 and 31, respectively, and to apply the selected signal to the input point SW3'(b) of the switch SW3'. In the digital recorder of FIG. 7, circuit designs identical to those of FIGS. 3 and 5 can be created by setting switch SW5' to select input signals SW5'(a) and SW5'(b), respectively.

The switches may comprise an operative switch located either on the front panel of a digital tape recorder or on a housing in which the signal path setting section of the separate type digital tape recorder is contained. However, the signal path setting section will be inconvenient to operate depending on the condition of selective setting of the switches.

A method of more easily obtaining a desired function will be described with respect to the embodiment of FIG. 5. As shown in FIG. 5, an operative switch section 32 may be placed on the front panel of a housing in which the signal path setting section 30' is contained. The operative switch section 32 includes a digital switch (hereinafter referred to as D switch) $32_1$, an internal D/A switch (hereinafter referred to as IDA switch) $32_2$ and an analog switch (hereinafter referred to as an A switch) $32_3$ for switching the recording signals. A switch control circuit 33 may be provided in the signal path setting section 30'. Operative signals $S_{11}$, $S_{12}$ and $S_{13}$, generated in response to the operation of the respective operative switches $32_1$, $32_2$, and $32_3$, are applied to the switch control circuit 33. The switch control circuit 33 receives the operative signals $S_{11}$, $S_{12}$, and $S_{13}$ and applies switch control signals $S_{22}$, $S_{23}$, and $S_{24}$ based on the predetermined setting conditions to the respective control signal input points SW2'(c), SW3'(c) and SW4'(c) of the switches SW2', SW3' and SW4'. The switches SW2', SW3' and SW4' are designed to select the input signals corresponding to the input control signals, respectively.

The following table indicates the control conditions under which the switch control circuit 33 operates in response to the operations of the operative switches.

TABLE

| | SW2' | SW3' | SW4' |
|---|---|---|---|
| D switch $32_1$ | (a) | (a) | — |
| IDA switch $32_2$ | (b) | (b) | (b) |
| A switch $32_3$ | (b) | (a) | (a) |

According to the Table, when the operative signal $S_{11}$ is generated by the operation of the D switch $32_1$, for example, the switch control circuit 33 receives the operative signal $S_{11}$ and generates the control signals $S_{22}$ and $S_{23}$ so that the switches SW2' and SW3' select the input signals at the input point SW2'(a) and SW3'(a), respectively. In this case, the switch SW4' may be set so as to select the input signal from either the input point SW4'(a) or SW4'(b). Setting the signal path in this manner will cause the digital recording signal based on the digital signal $S_1$ at the digital input terminal 1 to be recorded on the magnetic tape in recording mode, while the digital and analog output signals corresponding to the digital signal $S_1$ may be supplied through the digital and analog output terminals 5 and 11.

When the operative signal $S_{12}$ is generated by the operation of the IDA switch $32_2$, the switch control circuit 33 receives the operative signal $S_{12}$ and generates the control signals $S_{22}$, $S_{23}$ and $S_{24}$ so that the switches SW2′, SW3′ and SW4′ select the input signals at the input point SW2′(b), SW3′(b), and SW4′(b), respectively. Setting the signal path in this manner will cause the digital signal $S_5$ input at the digital input terminal 31, when in recording mode, to be converted by the D/A converter means 10′ into the analog signal, which is reconverted by the A/D converter means 9′ into the digital recording signal. The digital recording signal is recorded on the magnetic tape by the modulated signal recording and playing back means 3′. Also, the digital and analog signals corresponding to the digital signal $S_5$ can be output from the digital and analog output terminals 5 and 11, respectively.

When the operative signal $S_{13}$ is generated by the operation of the A switch $32_3$, the switch control circuit 33 receives the operative signal $S_{13}$ and generates the control signals $S_{22}$, $S_{23}$ and $S_{24}$ so that the switch SW2′ selects the input signal at the input point SW2′(b) and the switches SW3′ and SW4′ select the input signals at the input points SW3′(a) and SW4′(a), respectively. Setting the signal path in this manner will cause the analog signal $S_2$ input at the analog input terminal 6 when in recording mode, to be converted by the A/D converter means 9′ into the digital recording signal, which is recorded on the magnetic tape by the modulated signal recording and playing back means 3′. Also, the digital and analog signals corresponding to the digital signal $S_2$ can be output from the digital and analog output terminals 5 and 11, respectively.

When it is desired that the modulated signal recording and playing back means 3′ be in playback mode, the D switch $32_1$, or the A switch $32_3$, is operated. In this manner, the switch SW3′ is set so as to select the input signal at the input point SW3′(a). Thus, the digital and analog output signals corresponding to the reproduced digital signal from the modulated signal recording and playing back means 3′ through the terminal 28 will have an output from the digital and analog output terminals 5 and 11, respectively.

Although only the method of controlling the switches of the digital recorder of FIG. 5 is described, the switches of the digital recorder of the other figures may be controlled in the same manner.

It should be noted that the conditions on which the switch control circuit 33 controls the switches are never limited to those listed in the Table. For example, when the A switch $32_3$ is operated, the switch SW3′ may be set to select the input signal at the input point SW3′(b) in order that the circuit of FIG. 5 serve as the D/A converter, while the analog signal input through the analog input terminal 6 may be recorded after it is converted into the digital signal. Thus, various conditions may be set under which the switch control circuit 33 controls the switches so that the circuit can serve in various forms. Also, the number of operative switches may be prepared to correspond to the number of set conditions so that the desired signal paths may be set in response to the operation of the operative switches. Furthermore, the switch control circuit 33 and the two contact type switches SW2′ through SW4′ may be replaced by switches having the number of contacts corresponding to the number of conditions on which the circuit is set. Thus, such switches may be directly operated to control the number of conditions.

Level adjusting means, such as a level adjusting potentiometer between the D/A converter means 10′ and the A/D converter means 9′ may be used, if necessary, so that there is a desired relationship of level between them. Although, in the illustrated embodiments, the RP switch of the modulated signal recording and playing back means is so constructed that it is automatically operated in association with the recording and playing back modes, it may also be manually operated so that the modulated signal recording and playing back means can be set so as to be monitored after its operation.

Although some embodiments of the invention have been illustrated and described with reference to the accompanying drawings, it will be apparent to those skilled in the art that they are examples, and that various changes and modifications may be made without departing from the spirit and scope of the invention. It should be noted that the invention is defined only by the appended claims.

What is claimed is:

1. A signal path setting circuit comprising:
   first switching means to select a signal from a plurality of digital signals including a first digital signal from recording and playing back means for making a digital recording and playback through a recording medium;
   D/A converter means to receive said selected signal from said first switching means and to convert this digital signal into a first analog signal;
   second switching means to supply a selected signal from a plurality of analog signals including said first analog signal from said D/A converter means;
   and A/D converter means to convert said analog signal from said second switching means into a second digital signal.

2. A signal path setting circuit as set forth in claim 1, and further comprising third switching means to select one of said second digital signal and an additional input digital signal to supply the selected one to said recording and playing back means.

3. A signal path setting circuit as set forth in claim 1, wherein a signal path setting section and said recording and playing back means are contained in a common container so that both of them are integrally provided.

4. A signal path setting circuit as set forth in claim 1, wherein a signal path setting section is provided separately from said recording and playing back means.

5. A signal path setting circuit as set forth in claim 1, wherein said first switching means includes an additional digital input terminal so as to select one of said first digital signal and an additional digital signal from said additional digital input terminal.

6. A signal path setting circuit comprising:
   A/D converter means to convert at least a first analog signal into a second digital signal;
   first switching means to select one of a first digital signal and said second digital signal from said A/D converter means and supply the selected one to recording and playing back means to digitally record and play it back through a recording medium;
   second switching means to select one of a third digital signal from said recording and playing back means and said first digital signal; and
   D/A converter means to convert said digital signal from said second switching means into a second analog signal, which is designed to have an output from an analog output terminal; and
   third switching means to select one of said first analog signal and said second analog signal from said D/A converter means and wherein said A/D converter means is so connected as to convert the selected one from said third switching means.

* * * * *